United States Patent [19]

Achee, Sr.

[11] Patent Number: 4,753,567

[45] Date of Patent: Jun. 28, 1988

[54] TRUNK LOADING APPARATUS FOR WHEELCHAIR

[76] Inventor: Norris S. Achee, Sr., 1119 Magnolia St., Gulfport, Miss. 39501

[21] Appl. No.: 63,397

[22] Filed: Jun. 18, 1987

[51] Int. Cl.⁴ .............................................. B60R 7/02
[52] U.S. Cl. .................. 414/462; 224/42.44; 414/522; 414/921
[58] Field of Search .............. 414/462, 463, 522, 921; 224/42, 44

[56] References Cited

U.S. PATENT DOCUMENTS

| | | | |
|---|---|---|---|
| 2,547,083 | 4/1951 | Lundgren | 414/463 |
| 2,778,517 | 1/1957 | Weinstein et al. | 414/462 |
| 3,627,158 | 12/1971 | Kobasic | 414/462 |
| 3,656,637 | 4/1972 | Lynn et al. | 414/462 X |

Primary Examiner—Leslie J. Paperner

[57] ABSTRACT

An automobile trunk loading apparatus for loading wheelchairs into the trunk of an automobile comprises a load frame having an aperture sized and located to accept the handwheel of a wheelchair. The apparatus is fitted with a support frame and lanyards to facilitate the removal of loading of a collapsed wheel chair from or into the trunk of an automobile and to reduce the hazard of muscular strain while the wheelchair is being loaded or unloaded.

1 Claim, 5 Drawing Sheets

TRUNK LOADING APPARATUS FOR WHEELCHAIR

BACKGROUND OF THE INVENTION

The loading and unloading of collapsable wheel chairs into and from automobile trunks is difficult because person loading or unloading such equipment must stand behind the automobile, bend over and reach forward to accomplish loading or unloading. A wheel chair weighs approximately 45 pounds and the lifting of such a weight from a position forward of the centerline of an erect human body imparts physically damaging strains to the back of any person attempting such lifting.

Many elderly or physically handicapped people do not have the strength to lift such a weight from an akward position behind an automobile.

Various types of apparatus have been developed for facilitating the loading of wheel chairs and other bulky heavy articles from and into the trunks of automobiles. While such apparatus generally reduces the strain caused by loading and unloading such articles, some difficulty remains in lifting the article above the trunk lip so that it may be moved horizontally out of the trunk compartment and lowered to the ground.

It is desirable to provide a simple trunk loading and unloading apparatus which may be quickly and easily installed into and removed from an automobile trunk and which in operation may be used by persons of relatively limited strength to easily load and unload unwieldly or heavy articles, such as collapsed wheel chairs, into and from the trunk of an automobile in which the apparatus has been installed.

It is the object of this invention to provide a loading apparatus which is economical, simple to install and easy to use.

It is an additional object of this invention to to provide an improved trunk loading apparatus which facilitates the upward lifting and removal of objects from the trunk of an automobile without causing undue strain on the back of the person loading or unloading the object.

The invention, as well as its many advantages may be further understood by reference to the following detailed description and drawings in which.

In the various figures, like parts are referred to by like numbers.

DESCRIPTION OF THE INVENTION

Figure 1:
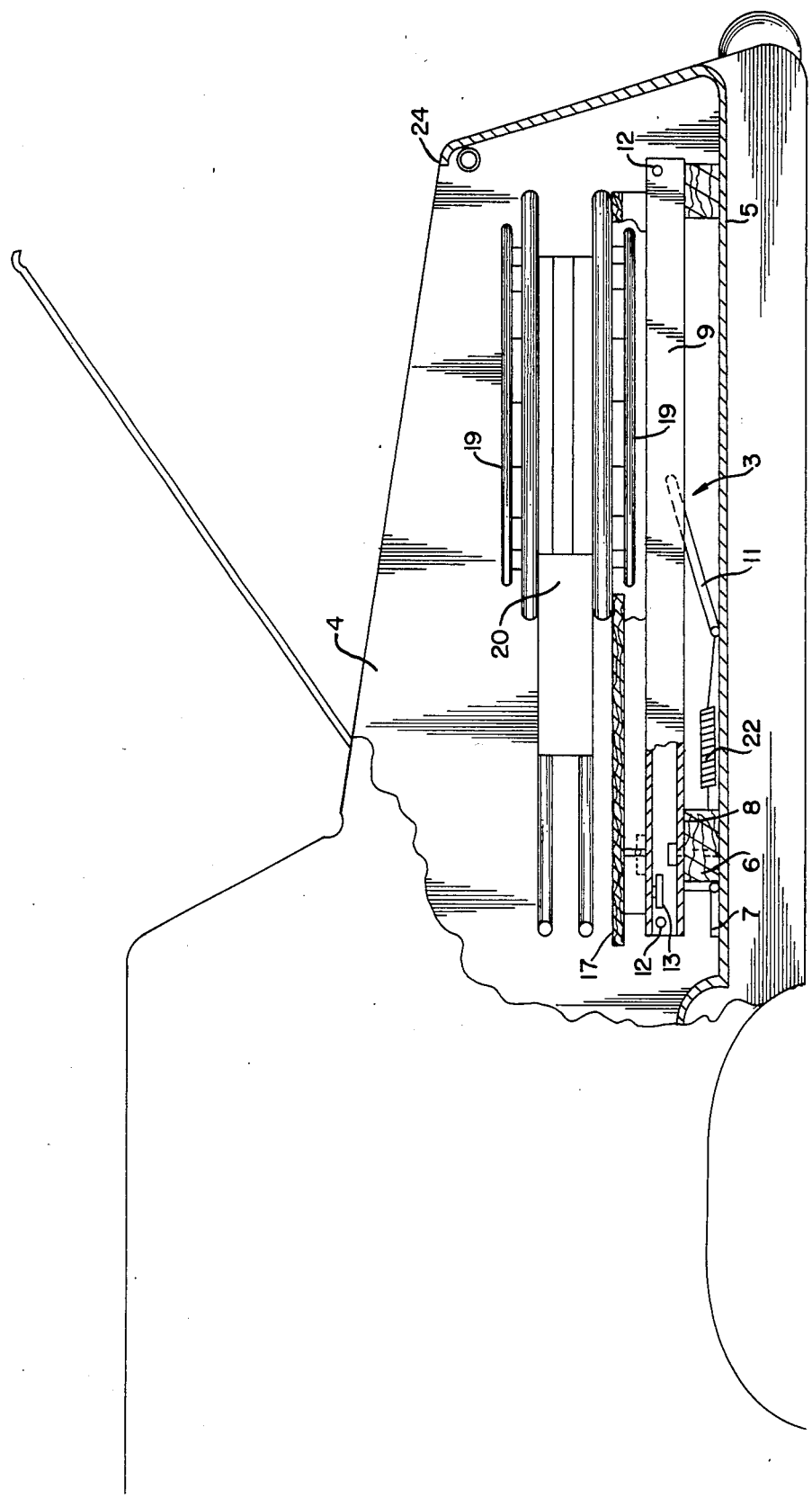
FIG. 1 is side view of a collapsed wheel chair in a stowed position on a loading apparatus in the trunk compartment of an automobile.

Referring to the drawings and more particularly to FIG. 1, there is shown a trunk loading apparatus 3, installed in a trunk compartment of an automobile 4, a means for attaching the loading apparatus 3 to the floor of the trunk compartment 5, said means including mounting bracket 6, mounting hinges 7, attaching the bracket 6 to the floor 5 of the trunk compartment 4.

The mounting bracket 6 is fitted with two anchoring pins 8 to hold track member 9 in position on the mounting bracket 6 but allowing limited forward and reverse movement of track member 9 with respect to mounting bracket 6.

Track members 9 are held parallel by cross braces 10 and are supported in the loading and unloading position by spring actuated support frame 11, the ends of track members 9 are fitted with stop pins 12 to prevent slide members 13 from becoming disengages from the track member 9. Lanyard 14 fitted with a "T" handle 15 has ends attached to the rear end of each track member 9 and the third end attached to the foot of the spring actuated support frame 11.

Slide members 13 are connected to the load frame 17 by means of hinges 23 which allow one end of the load frame 17 to be lowered to the ground while the other end remains attached to the track member 9. The load frame 17 has a circular aperture 18 of a size to easily accept the hand wheel 19 of a wheel chair 20 and positioned at a point to enable the incertion of the handwheel 19 into the apeture 18 without lifting the wheelchair from the ground but by simply tilting the collapsed wheelchair 20 against the load frame 17.

The load frame 17 is fitted with a lanyard 21 by which the load frame 17 is pulled horizontally from the trunk compartment 4 and the rear end of said load frame is lowered to the ground.

Upon opening the lid of the trunk compartment the loading apparatus is resting on the floor of the trunk compartment as illustrated in FIG. 1.

Figure 2:
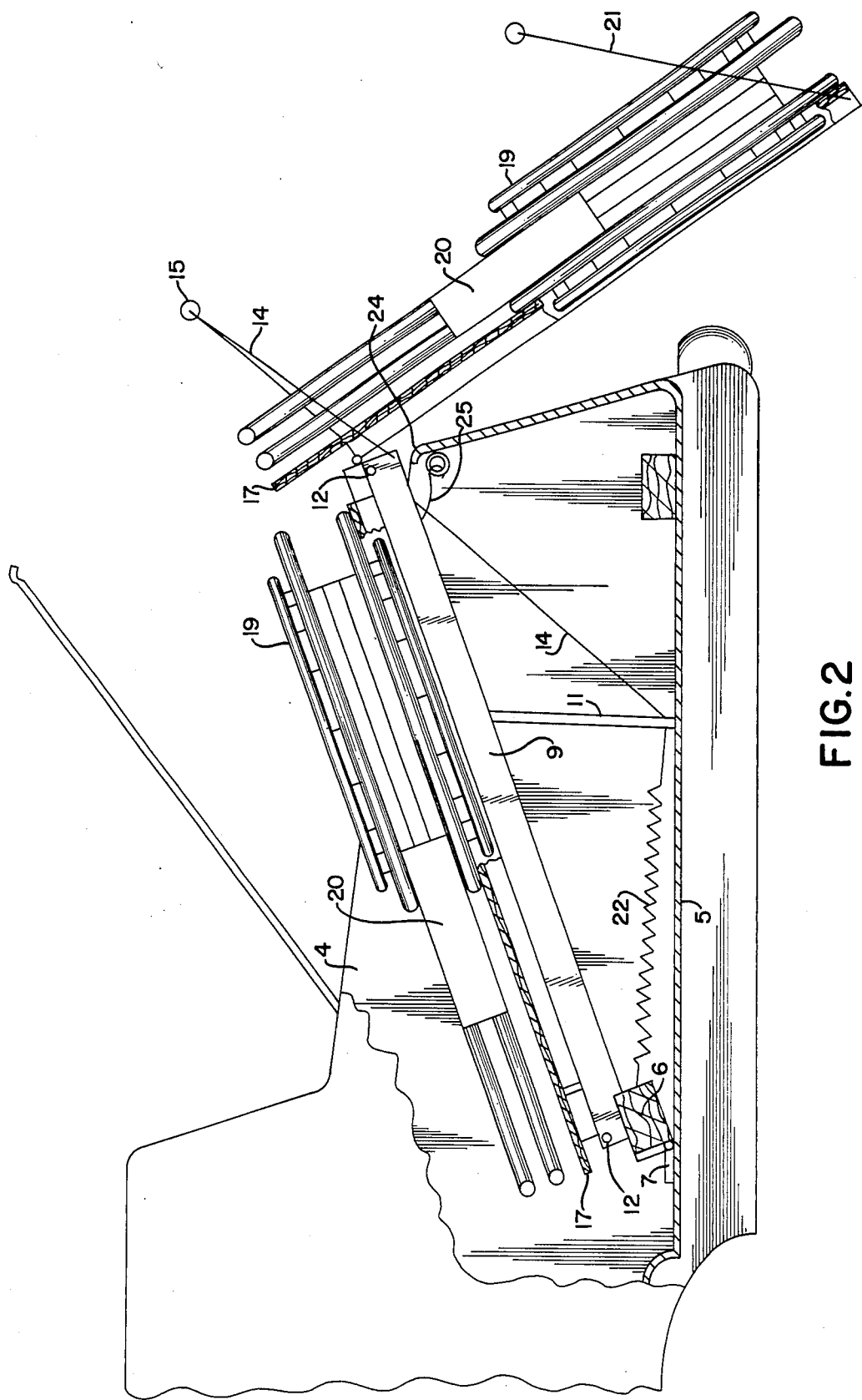
FIG. 2 is a side view of the loading apparatus in both the loading and unloading position and the fully extended position with the rear end of the load frame resting on the ground.
Figure 3:
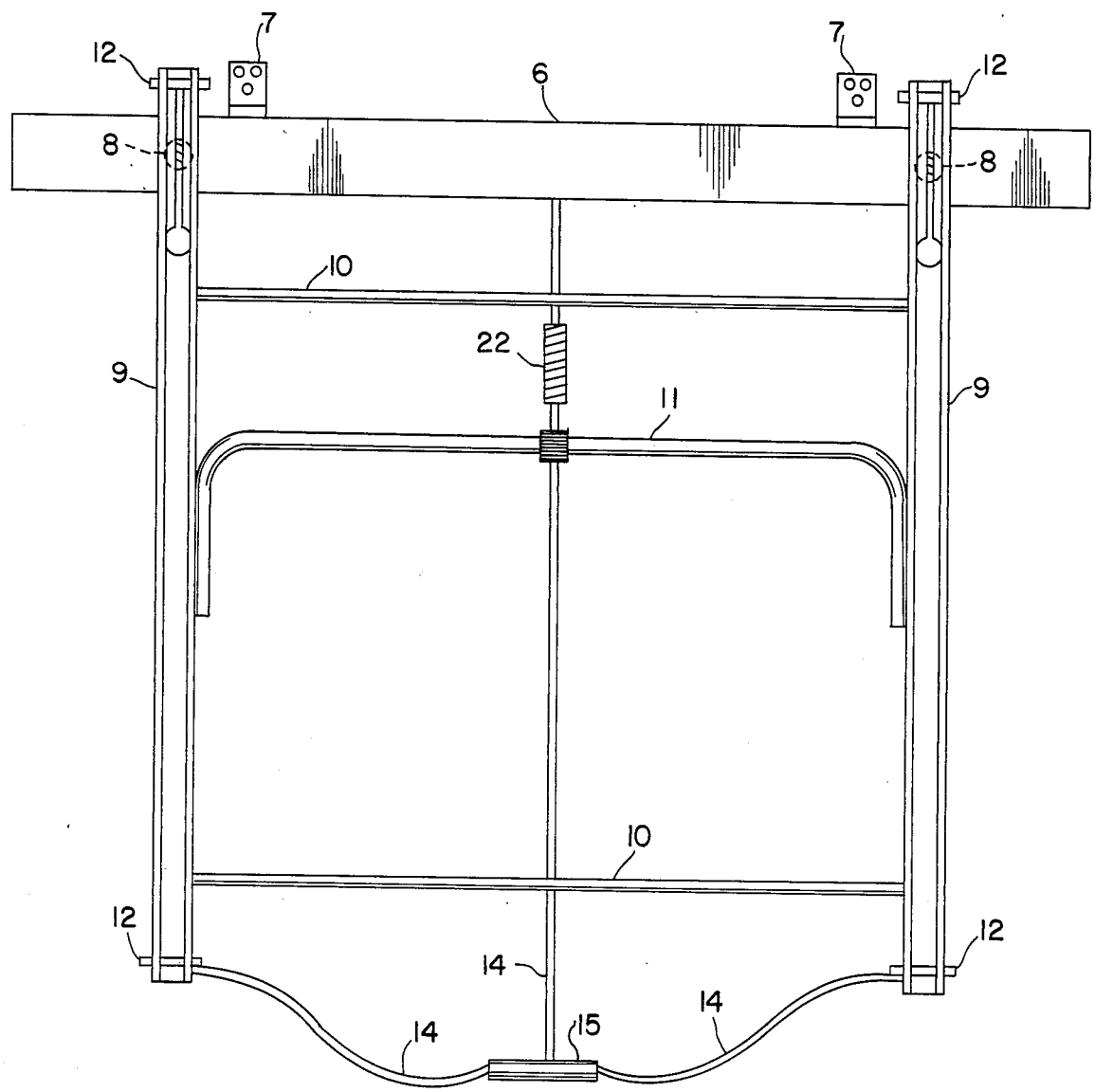
FIG. 3 is a top view of the teack members and mounting bracket with the load frame removed.
Figure 4:
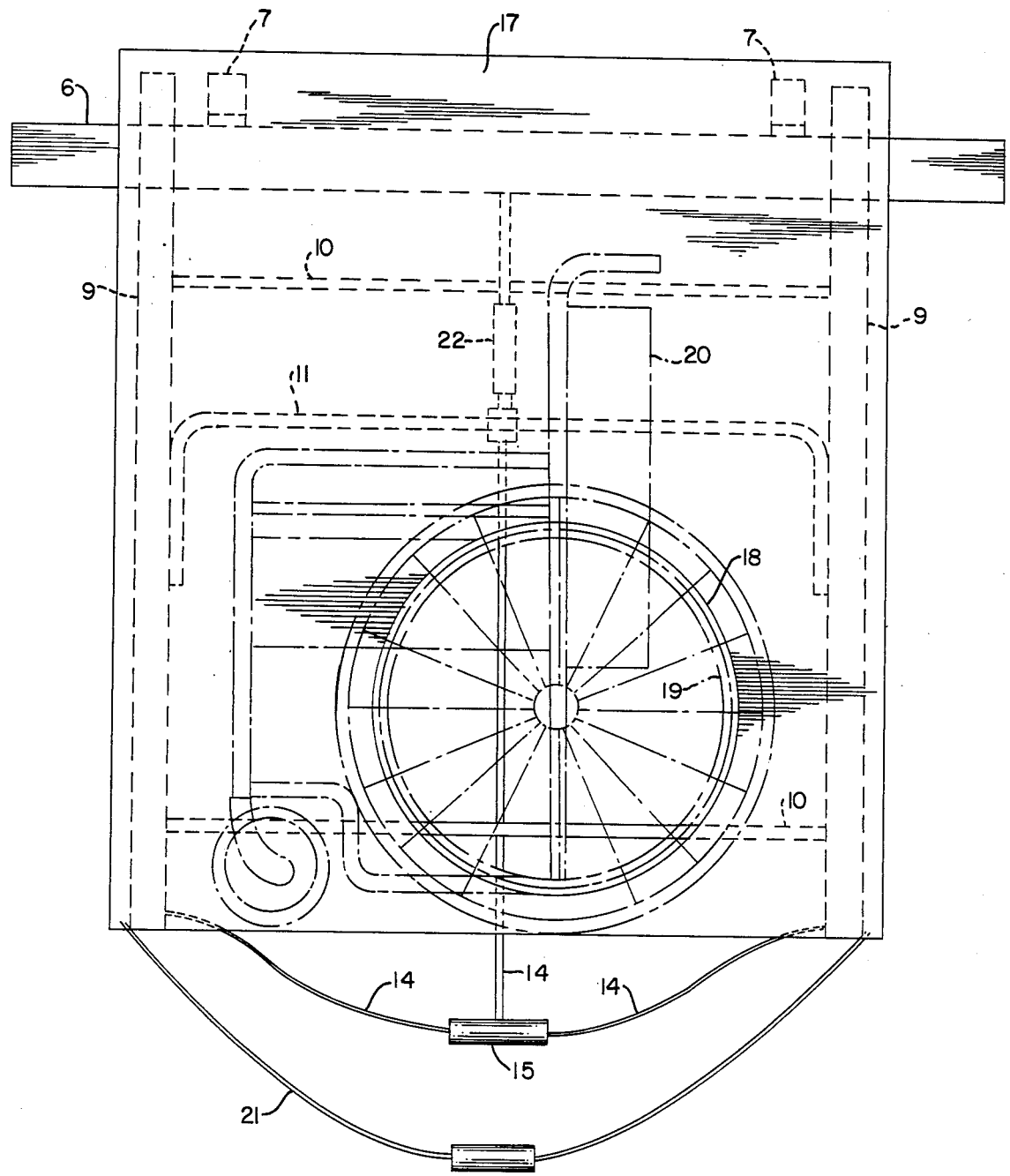
FIG. 4 is a top view of the load frame with a ghost image of a collapsed wheel chair installed.
Figure 5:
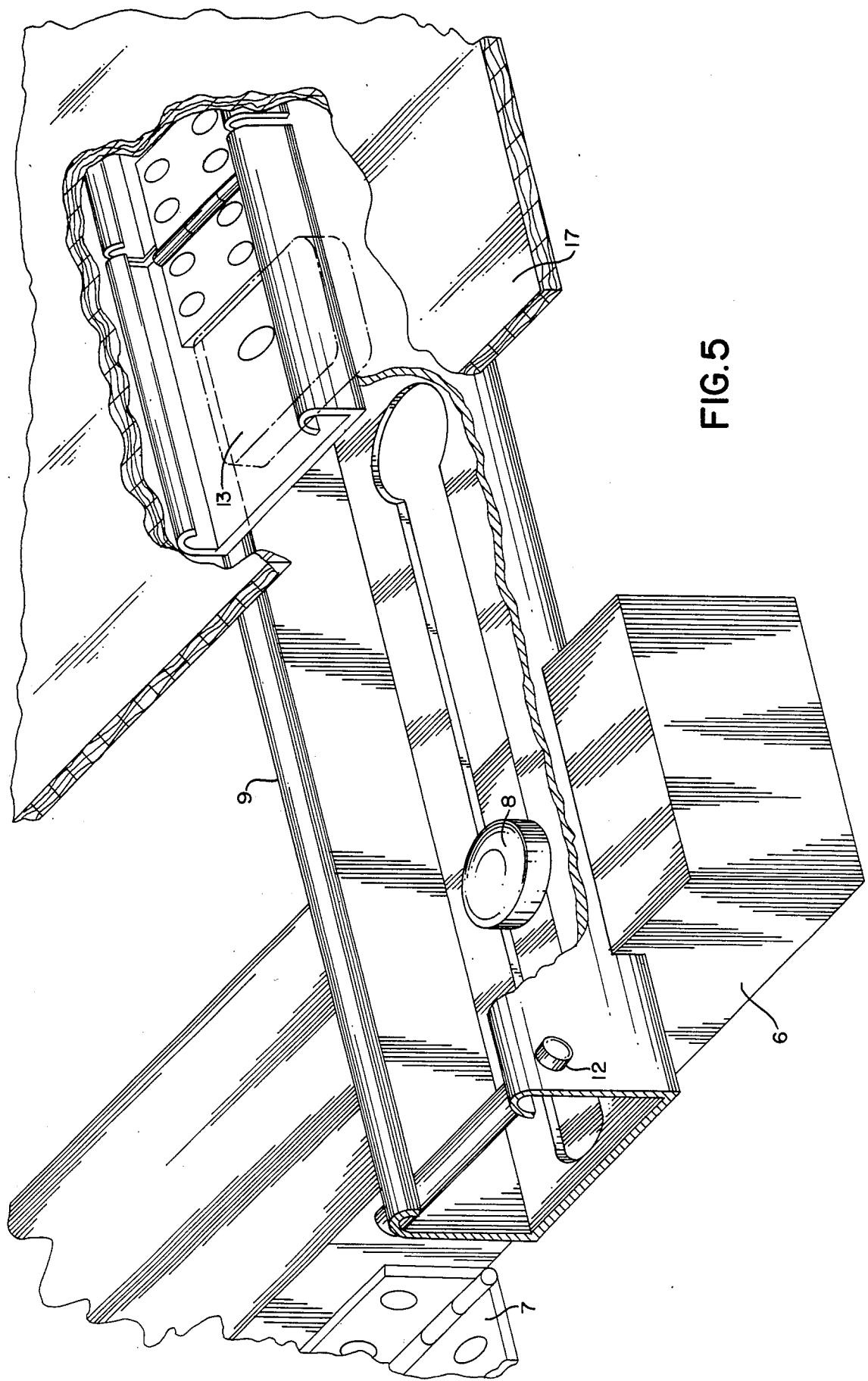
FIG. 5 is a fragmentary sectional view of the forward right hand corner of the loading apparatus illustrating the manner in which the mounting bracket is attached to the floor of the automobile and how the track members and the load frame are assembled.

In order to bring the loading apparatus into loading position shown in FIG. 2 lanyard 14 is pulled vertically and rewardly by handle 15 raising the ends of the track member slightly above and to the rear of the trunk compartment lip 24 at which time the support frame 11 is moved into loading and unloading position shown in FIG. 2. Lanyard 21 is then is pulled horizontally moving the loading frame 17 to a position such that the slide members 13 are against the stops 12 in the rear of track members 9. The free end of the load frame 17 is then lowered to the ground as shown in FIG. 2. A wheelchair 20 is positioned with a handwheel directly opposite the apeture 18 in the load frame 17 and tilted to insert the handwheel into the the loadframe 17. The free end of the load frame is then lifted by means of lanyard 21 to a position such that the load frame may be slid forward until slide members 13 are in contact with the forward stops 12 in track members 9. Restraining clip 25 is removed and the load frame 17 and the track members 9 are moved forward as a unit until both load frame 17 and track 9 members are forward of the trunk compartment lip 24. Lanyard 21 is looped around each end of track member 9 and used to raise the loading assembly allowing the support frame 11 to be pulled free by spring 22 the load apparatus 3 is then lowered to the floor 5 of the trunk compartment 4.

At times when the trunk compartment is to be used for objects other than a wheelchair the loading apparatus 3 may be easily removed from the trunk compartment 4 by moving the track members 9 froward on the mounting bracket 6 until the expanded head of the anchor pins 8 are alligned with the circular apeture at the ends of the longitudinal slots in the bottom of the forward end of the track members 9, from which position the loading apparatus 3 may be lifted free of the mounting bracket 6 and removed from the trunk compartment.

I claim:

1. A loading apparatus for the trunk compartment of an automobile comprising a load frame adapted to support a collapsed wheel chair, a pair of slide members pivotally attached to the underside of the forward portion of said load frame, a pair of track members slidingly attached to the said slide members, a stop means affixed to either end of each of said track members, adapted to prevent disengagement of the said slide member from the said track member, a mounting bracket having means to pivotally attach the said mounting bracket to the floor of an automobile trunk compartment, two anchoring pins adapted to permit limited horizontal relative movement between the said mounting bracket and the said track members, the said track members include two cross supports adapted to maintain the track members in parallel relation, a spring retractable support frame adapted to position the rear ends of the track members slightly above the top edge of the rear side of the trunk compartment opening when the said support frame is in the unretracted condition, a longitudinal slot in the forward end of each of said track members, each of said longitudinal slots terminating with a circular apeture at the rear end of the slot, said apeture being adapted to receive the flanged head of the said anchoring pins, a three strand lanyard fitted with a "T" handle, one each of two of the three strands of said lanyard being attached to the rear end of each track member, the third of said strands being attached to the foot of the support frame.

* * * * *